United States Patent
Carroni et al.

(10) Patent No.: US 7,632,472 B2
(45) Date of Patent: Dec. 15, 2009

(54) CATALYTIC REACTOR AND ASSOCIATED OPERATING METHOD

(75) Inventors: Richard Carroni, Niederrohrdorf (CH); Timothy Griffin, Ennetbaden (CH); Markus Wolf, Wettingen (CH)

(73) Assignee: ALSTOM Technology Ltd., Baden (CH)

(*) Notice: Subject to any disclaimer, the term of this patent is extended or adjusted under 35 U.S.C. 154(b) by 977 days.

(21) Appl. No.: 10/876,456

(22) Filed: Jun. 28, 2004

(65) Prior Publication Data

US 2004/0265194 A1 Dec. 30, 2004

(30) Foreign Application Priority Data

Jun. 27, 2003 (DE) .................. 103 29 162

(51) Int. Cl.
*B01J 35/02* (2006.01)
*H01M 2/00* (2006.01)

(52) U.S. Cl. .......................... 422/212; 429/17

(58) Field of Classification Search ............ 429/12, 429/17, 22, 13; 422/212, 191, 180; 208/133, 208/134; 423/648.1; 431/12
See application file for complete search history.

(56) References Cited

U.S. PATENT DOCUMENTS

| | | | |
|---|---|---|---|
| 4,897,253 A | 1/1990 | Jenkins | |
| 5,346,389 A | 9/1994 | Retallick et al. | |
| 6,126,439 A * | 10/2000 | Knopfel et al. | 431/350 |
| 6,289,888 B1 * | 9/2001 | Welles | 126/263.01 |
| 6,358,040 B1 | 3/2002 | Pfefferle et al. | |
| 6,391,484 B1 * | 5/2002 | Keskula et al. | 429/13 |
| 7,041,260 B1 * | 5/2006 | Hong et al. | 422/198 |
| 2003/0021748 A1 | 1/2003 | Hwang et al. | |
| 2003/0031608 A1 * | 2/2003 | Carroni et al. | 422/180 |

FOREIGN PATENT DOCUMENTS

| | | |
|---|---|---|
| DE | 44 45 784 A1 | 6/1995 |
| DE | 44 39 619 A1 | 5/1996 |
| DE | 692 07 592 T2 | 9/1996 |
| DE | 195 36 836 A1 | 4/1997 |
| DE | 195 44 683 A1 | 8/1997 |

(Continued)

OTHER PUBLICATIONS

Search Report from DE 103 29 162.8 (Jan. 29, 2004).

*Primary Examiner*—Patrick Ryan
*Assistant Examiner*—Monique Wills
(74) *Attorney, Agent, or Firm*—Cermak Kenealy Vaidya & Nakajima LLP; Adam J. Cermak

(57) ABSTRACT

A catalytic reactor for generating a hydrogen-containing synthesis gas from a rich fuel/oxidizing agent mix. The reactor (1) includes a multiplicity of parallel passages which extend from an inlet side (6) to an outlet side (7). To achieve a compact overall form of the reactor (1), at least in a core region of a cross section through the reactor (1) all the passages are of a catalytically active nature. In a first longitudinal part (8) of the reactor (1), which includes the inlet side (6), the catalytically active first passages have a larger proportion of the surface area provided with a catalytically active coating than the catalytically active second passages in a second longitudinal part (9) of the reactor (1), which includes the outlet side (7) and adjoins the first longitudinal part (8).

11 Claims, 3 Drawing Sheets

FOREIGN PATENT DOCUMENTS

| | | |
|---|---|---|
| DE | 692 22 777 T2 | 5/1998 |
| DE | 691 30 225 T2 | 4/1999 |
| DE | 692 30 894 T2 | 9/1999 |
| DE | 198 20 971 A1 | 11/1999 |
| DE | 100 27 400 C1 | 4/2001 |
| DE | 101 27 199 A1 | 2/2002 |
| DE | 101 47 338 A1 | 5/2002 |
| DE | 101 10 465 A1 | 10/2002 |
| DE | 101 14 328 A1 | 10/2002 |
| DE | 101 19 035 A1 | 10/2002 |
| DE | 101 36 313 A1 | 2/2003 |
| EP | 0 767 345 A2 | 4/1997 |
| EP | 1 010 462 A1 | 6/2000 |
| EP | 1 103 518 A1 | 5/2001 |
| EP | 1 265 029 A2 | 12/2002 |
| WO | 00/17577 | 3/2000 |
| WO | 00/76651 A1 | 12/2000 |
| WO | 01/51411 A1 | 7/2001 |
| WO | 01/71252 A1 | 9/2001 |

* cited by examiner

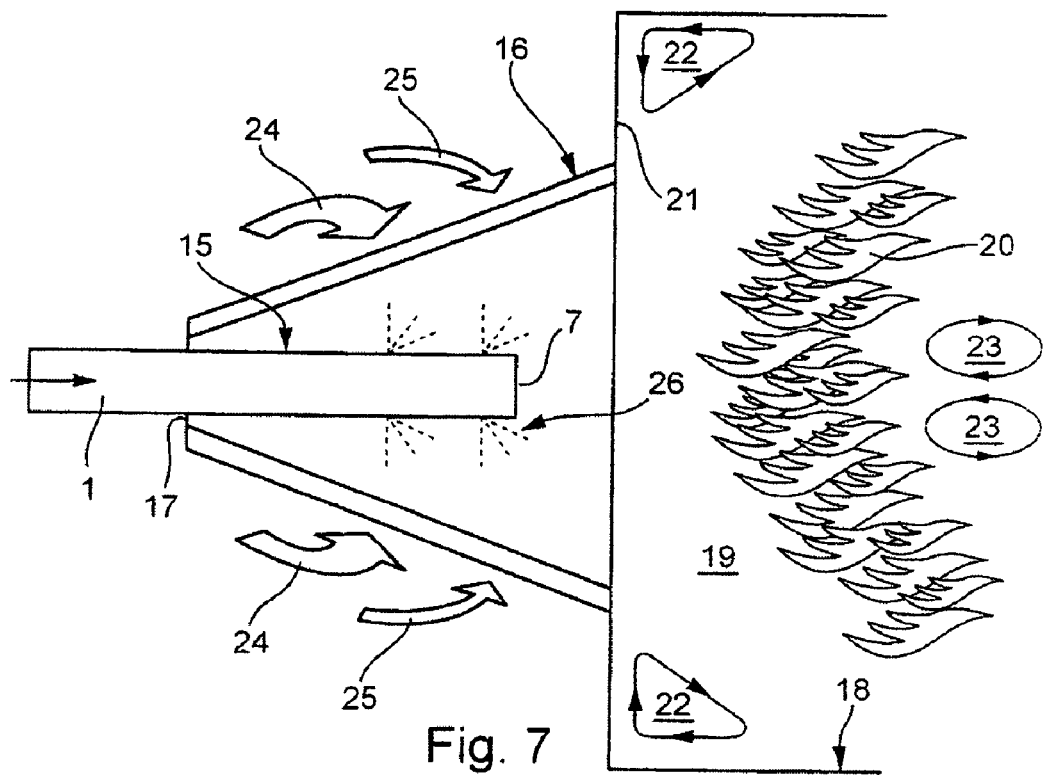
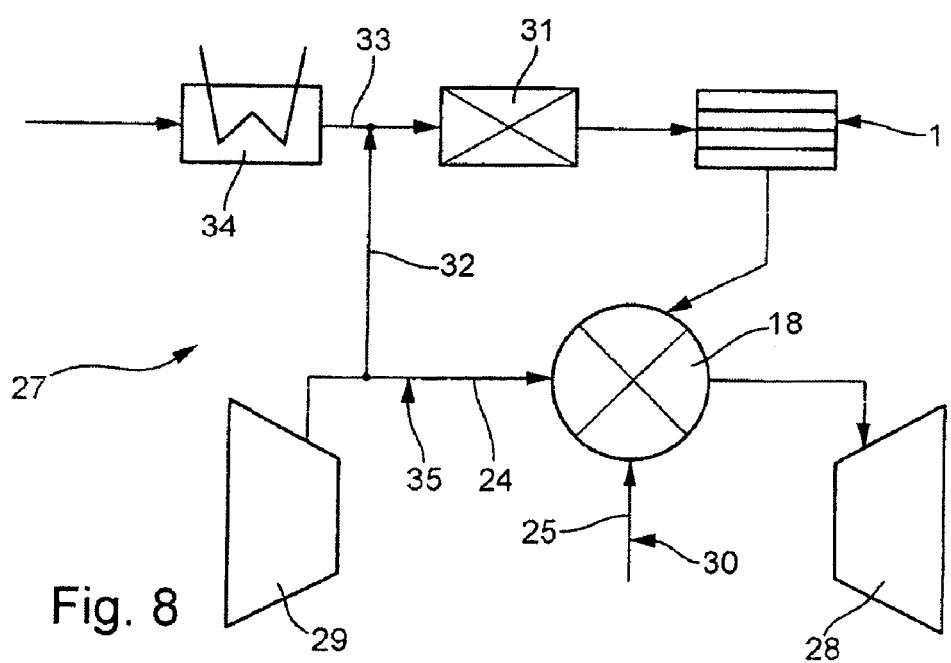
Fig. 7
Fig. 8

CATALYTIC REACTOR AND ASSOCIATED OPERATING METHOD

This application claims priority under 35 U.S.C. § 119 to German Application No. 103 29 162.8, filed 27 Jun. 2003, the entirety of which is incorporated by reference herein.

BACKGROUND OF THE INVENTION

1. Field of the Invention

The present invention relates to a catalytic reactor for generating a hydrogen-containing synthesis gas from a rich fuel/oxidizing agent mix. Moreover, the invention relates to an operating method for a reactor of this type and to a burner arrangement configured with a reactor of this type.

2. Brief Description of the Related Art

In the case of a burner arrangement, in particular for a gas turbine of a power plant, as is known, for example, from EP 1 265 029 A2, there is always a need to stabilize a flame front which forms in a combustion chamber when the burner arrangement is operating, in order on the one hand to achieve a combustion operation with minimum possible emissions of pollutants and in order on the other hand to prevent the combustion reaction from being extinguished. In particular when the burner arrangement is being run up or in operating states with low loads, a stable flame front is of increased importance, on account of the lower temperatures.

U.S. Pat. No. 5,346,389 has disclosed a catalytic converter which includes a multiplicity of parallel passages, with catalytically active passages and catalytically inactive passages being arranged alternately over the entire cross section of the catalytic converter. This makes it possible for the catalytically active passages to be cooled by the gas flow in the catalytically inactive passages. Then, a heterogeneous combustion reaction can take place in the catalytically active passages, in which more or less fuel of a lean fuel/oxidizing agent mix is converted by complete oxidation. This catalytic converter may be connected upstream of a combustion chamber in order to increase the temperature therein. This allows the homogenous combustion reaction taking place in the combustion chamber to be thermally stabilized.

U.S. Pat. No. 6,358,040 B1 has disclosed a catalytic converter arrangement through which a rich fuel/oxidizing agent mix flows, with the fuel being completely oxidized. The heat which is generated is released direct to an oxidizing agent flow, which downstream of the catalytic converter arrangement is mixed with the rich combustion exhaust gasses and burnt homogenously in a combustion chamber. This measure also increases the temperature of the fuel/oxidizing agent mix fed to the combustion chamber, which thermally stabilizes combustion in the combustion chamber.

To enable the combustion chamber to be operated stably even at low load, it is, moreover, customary to increase the proportion of fuel in the lean fuel/oxidizing agent mix, in order in this way to increase the temperature in the combustion chamber. This allows a temperature level which is sufficiently above an extinction limit, at which the flame in the combustion chamber is extinguished, to be maintained. The shift in the fuel/oxidizing agent mix from lean in the direction of rich, however, leads to increased formation of pollutants in the combustion reaction. In particular, the $NO_x$ emission increases.

It is known from EP 0 767 345 A1 to use a hydrogen generator to generate a hydrogen-containing gas from a fuel/oxidizing agent mix and to admix this gas with a fuel/oxidizing agent mix. The hydrogen increases the reactivity of the fuel/oxidizing agent mix, so that it is possible to improve the combustion in a catalytic burner stage. The hydrogen generator used in this process fractionates the associated fuel and thereby generates the hydrogen preferably with the aid of a catalyst. The outlay on apparatus is in this case relatively high.

SUMMARY OF THE INVENTION

The present invention deals with the problem of showing a way of stabilizing the flame front in a combustion chamber which in particular can be realized at low cost yet prevents any increase in the emissions of pollutants.

The invention is based on the general idea of equipping a catalytic reactor, at least in a core region of its cross section, with catalytically active passages only, the passages in an upstream first longitudinal part of the reactor having a greater proportion of the surface area provided with a catalytically active coating than in a subsequent, downstream second longitudinal part of the reactor. Under the corresponding operating conditions, a reactor of this type generates from a rich fuel/oxidizing agent mix supplied a synthesis gas which contains a relatively high proportion of hydrogen. This synthesis gas can be introduced into a combustion chamber in order to stabilize the homogenous flame front there. In this context, it has been found that with the aid of the hydrogen it is possible to considerably reduce the extinction temperature of the combustion reaction taking place in the combustion chamber. This increases the temperature difference between the temperature in the combustion chamber and the extinction limit. Accordingly, chemical flame stabilization results.

Furthermore, the thermal energy which is produced during generation of the hydrogen can be used to preheat the fuel/oxidizing agent mix supplied to the combustion chamber. To this extent, the reactor according to the invention also allows thermal flame stabilization.

Since the reactor according to the invention includes only catalytically active passages in its core region, the desired catalytic reaction can be ignited over a relatively short flow path and carried out with sufficient fuel conversion. This results in an extremely compact overall design of the reactor in the direction of flow through it, with the result that the reactor firstly can be realized at low cost and secondly can be retrofitted in particular in existing, compact installations.

The short overall structure of the reactor according to the invention, as seen in the direction of flow, also reduces the flow resistance of the reactor, with the result that it is possible to reduce a pressure drop during flow through the reactor.

It is worth noting in this context that the reactor, at least in its second longitudinal part, is configured as a partial oxidation catalytic converter, in which the fuel/oxidizing agent mix flowing therein is converted by partial oxidation into synthesis gas containing the desired hydrogen. Complete oxidation, in which heterogeneous combustion takes place, may in principle occur in the reactor, in particular in the inlet region of the first longitudinal part, but overall is very much in the background compared to the partial oxidation.

To start the reactor, it is fed with a rich fuel/oxidizing agent mix with a first fuel/oxidizing agent ratio and at a first inlet temperature. The first fuel/oxidizing agent ratio and the first inlet temperature are in this case matched to the catalytic reactivity of the first longitudinal part of the reactor in such a way that the rich fuel/oxidizing agent mix flowing into the reactor is ignited automatically. After the reactor has been started, the inlet temperature is reduced in accordance with the operating method of the invention, and then the fuel/oxidizing agent ratio is increased. This procedure advantageously makes use of the discovery that the surface temperature of the reactor is greatly increased after the reactor has been started up. However, an increased surface temperature means that with the fuel/oxidizing agent mix supplied, the catalytic reaction continues to react autonomously even at relatively low inlet temperatures. At the same time, at the higher surface temperatures in the reactor it is possible to shift the fuel/oxidizing agent ratio of the rich mix in the lean direction, in order to obtain a less rich mix. The reaction which continues autonomously is not adversely affected thereby, whereas the hydrogen production can be considerably increased by this measure. This is advantageous with regard to the long-term durability of the reactor material.

According to a particularly advantageous embodiment, the increase in the fuel/oxidizing agent ratio and/or the reduction in the inlet temperature can be carried out in such a way that an outlet temperature of the reactor remains substantially constant. This measure allows a predetermined outlet temperature to be established at the reactor relatively quickly; the synthesis gas production can also be maximized as a result.

Further important features and advantages of the present invention will emerge from the drawings and from the associated description of the figures on the basis of the drawings.

BRIEF DESCRIPTION OF THE DRAWINGS

Preferred exemplary embodiments of the invention are illustrated in the drawings and are explained in more detail in the description which follows, wherein identical reference designations in each case relate to identical or similar or functionally equivalent features.

In the drawings, in each case diagrammatically:

FIG. 7 shows an outline illustration in longitudinal section through a preferred form of use of the reactor, FIG. 8 shows an outline illustration in circuit diagram form of a burner arrangement according to the invention.

DETAILED DESCRIPTION OF THE PREFERRED EMBODIMENTS

Figure 1:
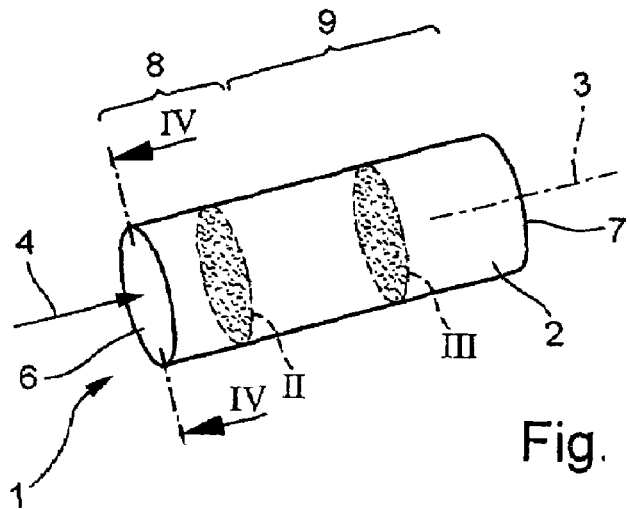
FIG. 1 shows a greatly simplified three-dimensional view of a reactor according to the invention.

In accordance with FIG. 1, a catalytic reactor 1 according to the invention comprises a reactor body 2, which in this case is cylindrical, in particular circular-cylindrical, in form. In principle, other geometries are also possible. The reactor 1 has a longitudinal axis 3, which is oriented parallel to a flow symbolized by an arrow 4. The reactor 1 includes a multiplicity of parallel passages 5 (cf. FIGS. 2 to 6), which run parallel to the longitudinal axis 3 and through which the gas flow 4 can flow. Furthermore, the reactor 1 has an inlet side 6, onto which the gas flow 4 flows and through which the gas flow 4 enters the reactor 1 or its passages 5. The gas flow 4 emerges again from the passages 5 or from the reactor 1 at an outlet side 7 which is remote from the inlet side 6. The passages 5 extend from the inlet side 6 to the outlet side 7.

According to the invention, the reactor 1 is divided in its longitudinal direction 3 into two longitudinal parts, namely an upstream first longitudinal part 8 and a downstream second longitudinal part 9. The passages 5 which run in the first longitudinal part 8 are referred to below as first passages $5_I$, whereas the passages 5 arranged in the second longitudinal part 9 are referred to below as second passages $5_{II}$.

According to the invention, at least in a core region (cf. reference numeral 10 in FIG. 6) of a cross section through the reactor 1, all the passages 5 are catalytically active in form. This core region 10 extends concentrically with respect to the reactor 1 or concentrically with respect to its longitudinal center axis. In the embodiment shown in FIG. 1, all the passages 5 of the reactor cross section are of a catalytically active nature, i.e. not just those in the core region 10.

In this context, it is of crucial importance that the catalytically active first passages $5_I$ of the first longitudinal part 8 have a greater proportion of the surfaces exposed to the gas flow provided with a catalytically active coating than the catalytically active second passages $5_{II}$ of the second longitudinal part 9.

The reactor 1 serves to generate a hydrogen-containing synthesis gas when a rich fuel/oxidizing agent mix flows through the reactor 1. This is achieved by incomplete oxidation or partial oxidation of the fuel in the mix. The increased catalytic activity on account of the greater proportion of the surface area being catalytically active means that the fuel/oxidizing agent mix flowing in can be ignited automatically in the first longitudinal part 8, given suitable boundary conditions, in order to start the desired catalytic reaction. The subsequent second longitudinal part 9, on account of the reduced proportion of the surface area which is catalytically active, is designed for optimum hydrogen synthesis, while at the same time excessive evolution of heat should be avoided. Since the primary function of the first longitudinal part 8 is to initiate and stabilize the catalytic converter reaction, the fuel may quite easily even be completely oxidized in the first longitudinal part 8. However, the partial oxidation component is dominant in both longitudinal parts 8, 9 for generation of the hydrogen.

In accordance with FIGS. 2 to 5, passages 5 which run parallel to the longitudinal direction 3 and are adjacent to one another transversely with respect to the longitudinal direction 3 are separated from one another by common walls 11. These walls 11 have surfaces 12 which are exposed to the passages 5 or the gas flow flowing therein. In a preferred design of the reactor 1, in order to realize the catalytic activity of the individual passages 5 there is provision for the surfaces 12 of the passages 5 to be provided with a catalytically active coating 13. To realize the different catalytic activities of the individual passages $5_I$ and $5_{II}$ in the different longitudinal parts 8, 9, the proportion of the surface area provided with a catalytically active coating, i.e. the surface area provided with a catalytically active coating with respect to the overall surface area, is greater in the first passages $5_I$ than in the second passages $5_{II}$. This design means that the heat which is generated during the catalytic reaction cannot be dissipated particularly well, and consequently the temperature of the reactor 1 rises quickly in the first longitudinal part 8. This assists with the production of the synthesis gas. By contrast, in the second longitudinal part 9 there are more uncoated surfaces 12, with the result that more heat can be released to the gas flow and carried away. To this extent, a cooling action is produced in the second longitudinal part 9, preventing the respective material of the reactor 1 from overheating. Nevertheless, the proportion of the surface area which is catalytically active in the second passages $5_{II}$ is matched to the length or residence time in such a way that a breakthrough of the oxidizing agent, in particular $O_2$, is minimized and the production of the synthesis gas is maximized.

Figure 2:
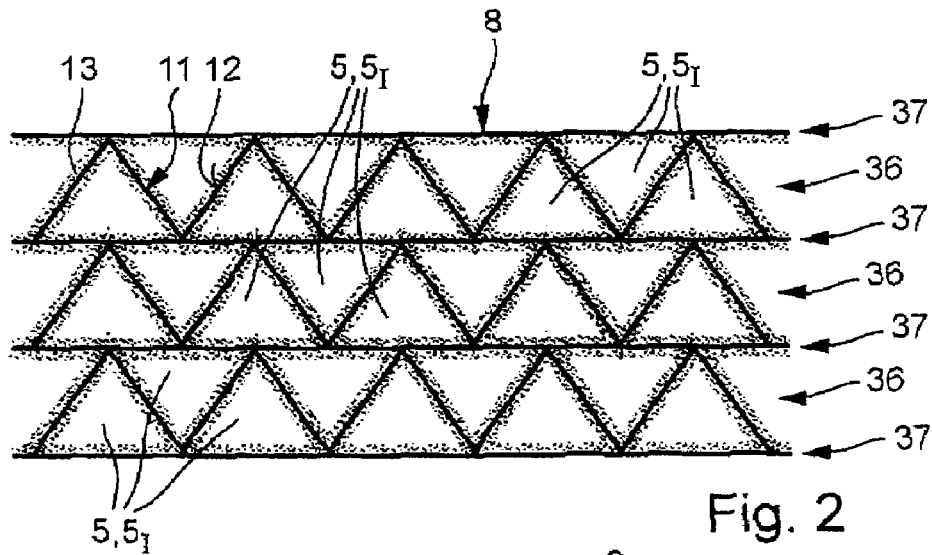
FIG. 2 shows an excerpt from a cross section in a first longitudinal part of the reactor corresponding to section II in FIG. 1.
Figure 3:
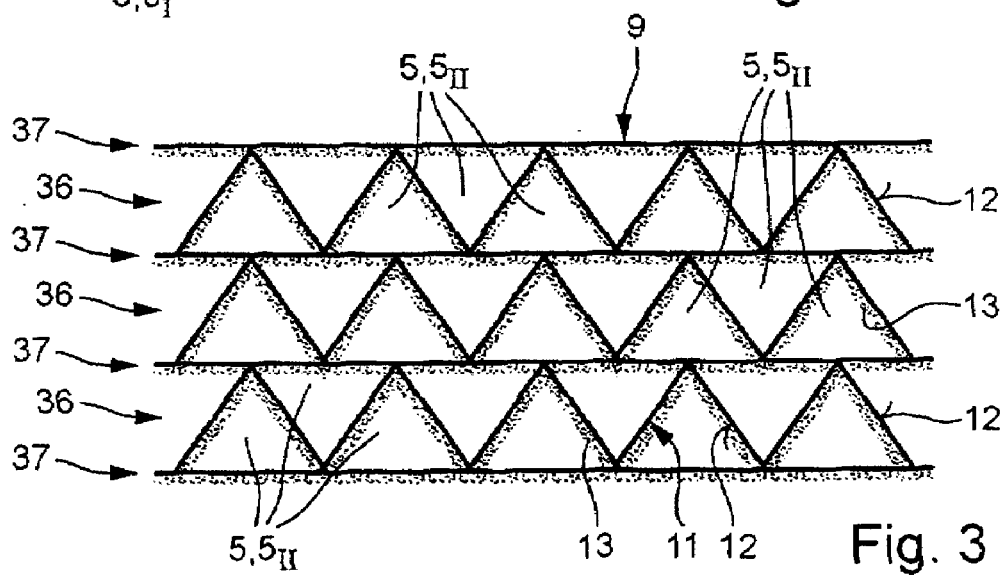
FIG. 3 shows an excerpt from a cross section through a second longitudinal part of the reactor corresponding to section III in FIG. 1.
Figure 4:
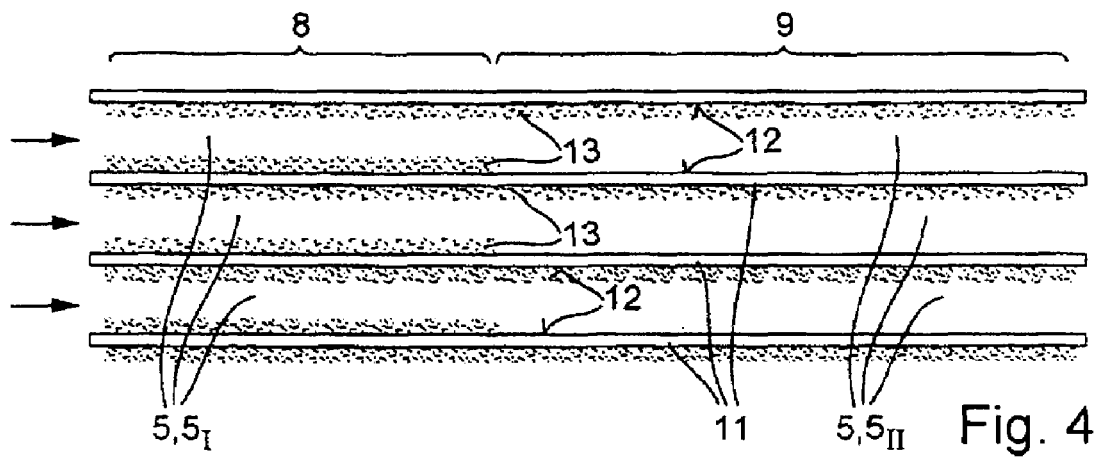
FIG. 4 shows an excerpt from a greatly simplified longitudinal section through the reactor corresponding to section lines IV in FIG. 1.

In the embodiments of FIGS. 2 to 4, the walls 11 of the first passages $5_I$ are each made catalytically active on two sides or provided with the catalytically active coating 13 on two sides. By contrast, the walls 11 at the second passages $5_{II}$ are each made catalytically active on just one side or provided with the catalytically active coating 13 on just one side. The result of this is that in the second passages $5_{II}$ heat is generated on just one side of the wall by the catalytic reaction, whereas this heat can be released to the gas flow on the other, uncoated or catalytically inactive side of the wall.

The reduced reactivity in the second longitudinal part 9 makes it possible overall to reduce the extent to which the reactor is heated to levels which allow the reactor 1 to have a relatively long service life.

Figure 5:
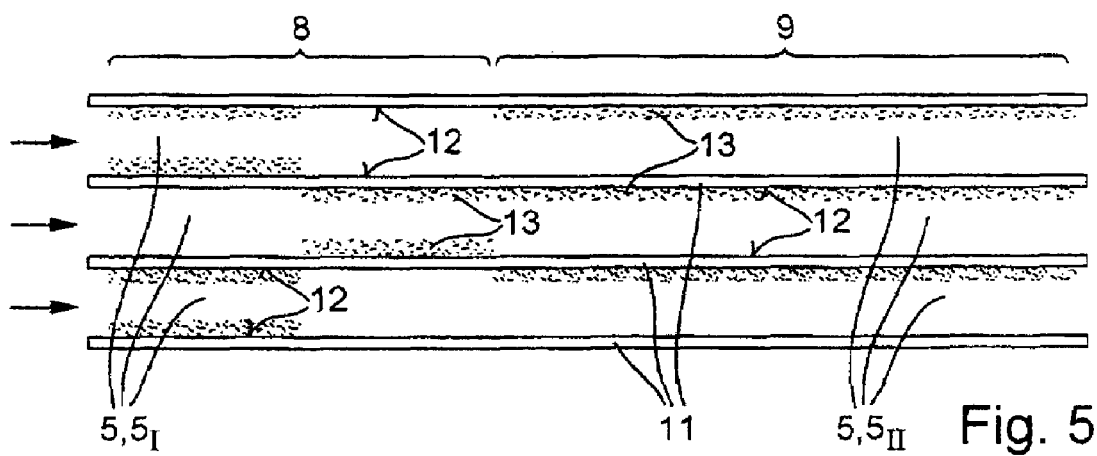
FIG. 5 shows the same view as in FIG. 4, but for a different embodiment.

Whereas in the embodiment shown in FIGS. 2 and 4 all the surfaces 12 of the first passages $5_I$ in the first longitudinal part 8 are catalytically active, FIG. 5 shows a variant in which uncoated or catalytically inactive surfaces 12 are also provided. In this case, active and catalytically inactive surfaces 12 may expediently alternate in the longitudinal direction 3 within individual first passages $5_I$, with catalytically active and catalytically inactive regions alternating transversely with respect to the longitudinal direction 3 in adjacent first passages $5_I$. However, in principle it is also possible to use other coating configurations for the first longitudinal part 8 and for the second longitudinal part 9. The aim is in any event to achieve the highest possible consumption rate for the corresponding oxidizing agent, preferably oxygen, so that a synthesis gas which contains a relatively low proportion of residual oxygen emerges at the outlet side 7 of the reactor 1.

As can be seen particularly clearly from FIGS. 2 and 3, the reactor 1 or its longitudinal parts 8 and 9 may preferably be produced by first web materials 36 which are corrugated or folded in a zigzag form and planar second web materials 37 being layered or stacked on top of one another in the normal direction. In this context, it is in principle possible for the individual web materials 36, 37 to be layered on top of one another by folding them over or alternatively to wind them onto one another by winding about the longitudinal center axis of the reactor 1. The individual webs 36, 37 may also expediently be wound onto a central core of the reactor 1. The web materials 36, 37, prior to the layering or stacking or winding, have already been provided with the catalytically active coating 13 at the corresponding regions or zones.

In principle, the first passages $5_I$ and the second passages $5_{II}$ may be configured identically with regard to their geometry. The passages 5 may also have the same hydraulic diameter. However, it is preferable to use an embodiment in which the hydraulic diameters of the first passages $5_I$ are larger than the hydraulic diameters of the second passages $5_{II}$. By way of example, the hydraulic diameter of a first passage $5_I$ is approximately double the hydraulic diameter of a second passage $5_{II}$. The larger hydraulic diameters in the first longitudinal part 8 allow the dissipation of heat at the inlet side 6 to be improved. This is particularly important since the spontaneous ignition means that it is the inlet side of the reactor 1 which is heated most. Increasing the size of the hydraulic diameters of the first passages $5_I$ in the first longitudinal part 8 also reduces the spontaneous ignition temperature of the reactor 1. At the same time, this measure also allows the pressure loss in the first longitudinal part 8 to be reduced.

The "hydraulic diameter" $h_d$ is calculated, for example, as follows:

$$h_d \frac{4 \times \text{cross-sectional area}}{\text{circumference}}$$

The hydraulic diameter therefore represents a one-dimensional comparison variable for any desired cross-sectional geometries.

The axial length of the passages 5 can then be defined as a function of their hydraulic diameter. It is advantageous for the axial length of the first passages $5_I$, i.e. the axial length of the first longitudinal part 8, to be approximately 4 to 25 times greater than the hydraulic diameter of a first passage $5_I$. It has proven appropriate for the axial length of the second passages $5_{II}$ or of the second longitudinal part 9 to be approximately 25 to 100 times greater than the hydraulic diameter of one of the second passages $5_{II}$.

In the embodiment shown in FIGS. 1, 4 and 5 the second longitudinal part 9 adjoins the first longitudinal part 8 directly, i.e. without any gaps. In principle, it is also possible to use embodiments in which the two longitudinal parts 8, 9 are at an axial distance from one another, in which case an axial distance of this type should expediently be less than 5 times the hydraulic diameter of one of the first passages $5_I$ or one of the second passages $5_{II}$. A greater distance could lead to undesirable interactions. The high concentrations of hydrogen and synthesis gas and of residual oxygen and fuel in the reactor 1 could, in the event of an excessively large volume, cause a homogenous combustion reaction to be ignited in the region of a transition, provided with this axial distance, between the longitudinal parts 8, 9 which is undesirable.

If not all the surfaces 12 in the first longitudinal part 8 are of a catalytically active nature, the fuel/oxidizing agent mix supplied can also be burnt heterogeneously with mixing ratios which approximate to a stoichiometric mixing ratio without excessively high surface temperatures being generated. On account of insufficient mixing, locally deviating fuel/oxidizing agent ratios may also occur in an inherently rich fuel/oxidizing agent mix. The reduced proportion of the surface area which is catalytically active means that the reactor 1 is better able to process insufficiently mixed mixes of this nature, since local temperature peaks can be more successfully dissipated to adjacent passages 5. The reactor 1 therefore becomes relatively insensitive to poor mixing in the fuel/oxidizing agent mix.

Figure 6:
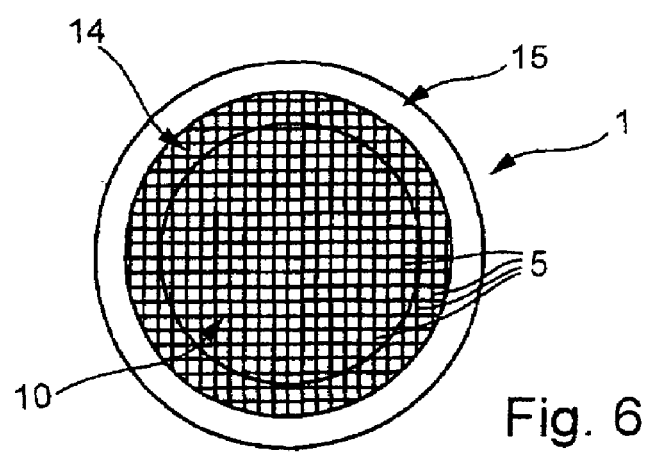
FIG. 6 shows a cross section through the reactor for another embodiment.

In accordance with FIG. 6, in a preferred embodiment the reactor 1 may have an annular region 14, which likewise extends coaxially with respect to the longitudinal center axis of the reactor 1 and in so doing coaxially surrounds the core region 10. The annular region 14 is also equipped with a multiplicity of parallel passages 5, but these passages, unlike the passages 5 of the core region 10, are all catalytically inactive. When the reactor 1 is operating, the respective fuel/oxidizing agent mix flows through both the passages 5 of the core region 10 and the passages 5 of the annular region 14. Whereas in the core region 10 the desired hydrogen synthesis takes place in conjunction with heating of the reactor 1, no catalytic reaction takes place in the passages 5 of the annular region 14. The annular region 14 therefore serves firstly to cool the reactor 1. Secondly, the annular region 14 prevents a lance 15 into which the reactor 1 can be inserted in accordance with FIG. 6 from overheating.

FIG. 7 shows a preferred form of use of the reactor 1, in which the reactor 1 is installed in the lance 15 of a premix burner 16. The premix burner 16 has a head 17 in which the lance 15 is arranged concentrically and from which the lance 15 projects centrally into the premix burner 16. On the exit side, the premix burner 16 is connected, for example, to a combustion chamber 18, in the combustion space 19 of which a homogenous combustion reaction is to take place. For this purpose, a flame front 20, which is to be relatively stably positioned in the combustion space 9, is generated in the combustion space 19. A sudden increase in cross section 21 at the transition between premix burner 16 and combustion space 19 and a swirling action imparted to the flow emerging from the premix burner 16 enable recirculation zones 22 and 23 to be generated in the combustion space 19, contributing to anchoring of the flame front 20. In the case of conventional combustion chambers 18, a lance 15 of this type, under low loads, can be used to stabilize the flame front 20. The lance 15 can also be used at higher loads to reduce pressure pulsation in order to counteract acoustic instability. For this purpose, the lance 15, in conventional operation, generates a diffusion flame, which causes relatively high $NO_x$ emissions. If, according to the invention, the reactor 1 is now fitted into the lance 15, it is possible to use the lance 15 to introduce the hydrogen-containing synthesis gas into the premix burner 16 and therefore into the combustion space 19. Introducing the synthesis gas into the combustion space 19 leads to a drop in the extinction limit for the flame front 20 and to an increase in the reaction temperatures without the generation of $NO_x$ increasing. The overall result is chemical and thermal stabilizing of the flame front 20.

An oxidizing agent main stream, as indicated by arrows 24, and a fuel main stream, as indicated by arrows 25, are fed to the premix burner 16. The synthesis gas which is generated in the reactor 1 can in principle emerge from the lance 15 at any desired location. However, it is preferable for the synthesis gas to emerge from the lance 15 at the free end (outlet side 7), so that it can be introduced in a particularly simple way into, for example, the central recirculation zone 23. It is also possible for the synthesis gas, which may be mixed with unburnt fuel/oxidizing agent mix, to emerge radially from the lance 15, as indicated by an arrow 26.

In accordance with FIG. 8, it is possible for a burner arrangement 27, which serves to fire a gas turbine 28, in particular of a power plant, to be equipped with the combustion chamber 18, which feeds its hot combustion exhaust gasses to the turbine 28. The turbine 28 drives a compressor 29, which compresses the oxidizing agent main stream 24 and feeds the latter, by means of a main oxidizing agent feed 35, to the combustion chamber 18 or its premix burner 16. A main fuel feed 30 supplies the combustion chamber 18 or its premix burner 16 with fuel. The burner arrangement 27 shown here is, moreover, equipped with at least one reactor 1 according to the invention, which supplies the synthesis gas generated therein to the combustion chamber 18 or its premix burner 16.

On the entry side, the reactor 1 is supplied with a rich fuel/oxidizing agent mix which is formed in a mixing device 31. The mixing device 31 is fed, via an additional oxidizing agent feed 32, with an oxidizing agent stream, which is expediently branched off from the main oxidizing agent feed 35 at the pressure side of the compressor 29. Furthermore, the mixing device 31 is supplied with a fuel stream, which is supplied via an additional fuel feed 33. In the additional fuel feed there is arranged a heating device 34, which enables the fuel supplied to be heated to a desired temperature. In addition or as an alternative, it is possible for the additional oxidizing agent stream supplied to the mixing device 31 to be preheated using a corresponding heating device. The heating device 34 may, for example, be operated electrically or in some other suitable way.

The text which follows provides a more detailed explanation of a starting procedure for the reactor 1 according to the invention:

To start the reactor 1, it is fed with a rich fuel/oxidizing agent mix, which has a first fuel/oxidizing agent ratio $\lambda_1$ in the range from approximately 0.15 to 0.25, in particular for example approximately 0.25, and a first inlet temperature $T_{E1}$ in the range from approximately 300° C. to 450° C., for example approximately 350° C. At these starting values, it is possible to achieve spontaneous ignition of the mix supplied in the first longitudinal part 8. The catalytic reaction in the reactor 1 causes the temperature of the latter to rise greatly. An outlet temperature $T_A$ at the outlet side 7 of the reactor 1 can be monitored, for example, by means of suitable measures. As soon as the outlet temperature $T_A$ reaches a predetermined value in the range from approximately 600° C. to 950° C., for example approximately 850° C., first of all the inlet temperature $T_E$ is reduced and in particular thereafter the fuel/oxidizing agent ratio $\lambda$ is increased. The increase in the fuel/oxidizing agent ratio $\lambda$ and/or the reduction in the inlet temperature $T_E$ expediently takes place continuously or in such a way that the outlet temperature $T_A$ remains substantially constant. In this way, it is possible to set a second fuel/oxidizing agent ratio $\lambda_2$, which is in the range from approximately 0.4 to 0.6, for example approximately 0.4, in the fuel/oxidizing agent mix supplied. Furthermore, the inlet temperature $T_E$ can be set to a second inlet temperature $T_{E2}$, which is in the range from only approximately 100° C. to 250° C., for example approximately 150° C. As soon as the desired values for the second inlet temperature $T_{E2}$ and the second fuel/oxidizing agent ratio $\lambda_2$ are reached, the starting procedure of the reactor 1 ends.

The procedure which is proposed in accordance with the invention allows the surface temperature of the reactor 1 to be kept at a sufficiently low level to achieve the maximum possible service life or durability of the reactor 1. At the same time, this measure on the one hand makes ignition and heating of the reactor 1 shorter and more reliable, while on the other hand the production of synthesis gas is optimized.

Despite its compact overall form, the reactor 1 according to the invention can operate at relatively high volumetric flows, e.g. at GHSV$\geq 4.5 \times 10^6$ hr$^{-1}$, where "GHSV"="gas hourly space velocity".

The production of the synthesis gas and the outlet temperature $T_A$ can preferably be controlled and optimized by varying the fuel/oxidizing agent ratio $\lambda$ and the inlet temperature $T_E$ in a more suitable way.

It is particularly simple to control the inlet temperature $T_E$ by suitable regulation of the heating device 34. By way of example, valves or the like in the feeds 30, 35 can be used to change the fuel/oxidizing agent ratio $\lambda$.

After the gas turbine has been run up, the inlet temperature $T_E$ increases simply as a result of the compressor 29 reaching a higher compression ratio, so that the heating device 34 can be switched off.

According to one particularly advantageous refinement, the reactor 1 according to the invention may form the first stage within a multistage catalytic burner, the further stages of which operate with lean fuel/oxidizing agent mixes. A multistage catalytic burner of this type can therefore likewise utilize the advantages of the hydrogen-containing synthesis gas in order, for example, to reduce the extinction limit or the spontaneous ignition temperature and to improve the fuel conversion. Furthermore, the reactor 1 and the multistage catalytic burner which has just been described may form part of a hybrid burner which operates both with catalytic combustion and with lean premix combustion.

Furthermore, the reactor 1 according to the invention may be used in a hybrid burner which operates with partial oxidation and with full oxidation, in which case the reactor 1 can then be used to realize the partial oxidation.

Furthermore, the reactor 1 shown here can also be used to stabilize other combustion systems, for example a secondary afterburn or also a flame-free combustion. As soon as the secondary combustion or the flame-free combustion are operating with methane ($CH_4$) or natural gas, they are very sensitive to disruptions to the pressure, the flow field, the temperature and the fuel/oxidizing agent mixing ratio. This sensitivity may lead to unstable operation and in particular to thermoacoustical problems in installations of this type. However, disruptions of this nature can be avoided by means of a relatively low proportion of hydrogen. Accordingly, the present invention enables the required quantity of hydrogen-containing synthesis gas for applications of this nature to be generated in order to stabilize or improve the combustion reaction in these cases too.

It is customary for a combustion chamber to be assigned a plurality of burners. To avoid instability, it is desirable for the flame characteristic of the individual burners to vary only slightly from burner to burner. This is not generally possible, since it requires a very complex fuel distribution system. If each burner has a reactor 1 connected upstream of or assigned to it, it is possible, with the aid of the reactor 1 according to the invention, to have a targeted influence, in narrow steps or continuously, on the flame characteristic or each individual burner by suitable control of the synthesis gas production and of the outlet temperatures. By way of example, it is also possible to vary the length of the reactors 1 used in the individual burners.

A further variant embodiment provides for the injection of steam upstream of the fuel-rich catalytic reactor, in order to produce further synthesis gas, with an increase in hydrogen production to levels above the limits which can be achieved with standard partial oxidation of fuel-rich mixes by a) water-gas shift at lower operating temperatures, and b) steam which post-forms the unreacted natural gas at higher temperatures.

In these cases, a larger proportion of the surface area, for example >40%, can be coated, since the high specific heat capacity of the steam has a much greater cooling effect on the surface temperatures.

List of Designations

1 Reactor
2 Reactor body
3 Longitudinal axis
4 Gas flow
5 Passage
$5_I$ First passage
$5_{II}$ Second passage
6 Inlet side
7 Outlet side
8 First longitudinal section
9 Second longitudinal section
10 Core region
11 Wall
12 Surface
13 Coating
14 Annular region
15 Lance
16 Premix burner
17 Head
18 Combustion chamber
19 Combustion space
20 Flame front
21 Sudden increase in cross section
22 Recirculation zone
23 Recirculation zone
24 Oxidizing agent flow
25 Fuel flow
26 Mix injection
27 Burner arrangement
28 Gas turbine
29 Compressor
30 Main fuel feed
31 Mixing device
32 Additional oxidizing agent feed
33 Additional fuel feed
34 Heating device
35 Main oxidizing agent feed
36 First web material
37 Second web material While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A catalytic reactor for generating a hydrogen-containing synthesis gas from a rich fuel/oxidizing agent mix, comprising:
   a multiplicity of parallel passages which each extend from an inlet side to an outlet side;
   all the passages being catalytically active at least in a core region of a cross section though the reactor;
   a catalytically active coating on surfaces of the passages which are to be exposed to the gas flow;
   the multiplicity of passages comprising catalytically active first and second passages, the catalytically active first passages being in a first longitudinal part of the reactor which includes the inlet side, the first passages having a greater proportion of the surface area provided with catalytically active coating than the catalytically active second passages, the second passages being in a second longitudinal part of the reactor which includes the outlet side and adjoins the first longitudinal part.

2. The reactor as claimed in claim 1, wherein the surfaces of the first passages are completely provided with a catalytically active coating, and the surfaces of the second passages are only partially provided with a catalytically active coating.

3. The reactor as claimed in claim 1, further comprising:
   common walls separating from one another passages which are transversely adjacent; and
   wherein the walls in the first passages are catalytically active on two sides, the walls in the second passages are catalytically active on one side, or both.

4. The reactor as claimed in claim 1, wherein the hydraulic diameter of the first passages is greater than the hydraulic diameter of the second passages.

5. The reactor as claimed in claim 1, wherein:
   the axial length of the first passages is between four and twenty-five times greater than the hydraulic diameter of one of the first passages;
   the axial length of the second passages is between twenty-five and one hundred times greater than the hydraulic diameter of one of the second passages;
   or both.

6. The reactor as claimed in claim 1, wherein:

the second longitudinal part directly adjoins the first longitudinal part; or the second longitudinal part is at an axial distance from the first longitudinal part, with the distance between the first and second longitudinal parts being less than five times the hydraulic diameter of one of the first passages or of one of the second passages.

7. The reactor as claimed in claim 1, further comprising:

an annular region coaxially surrounding the core region and catalytically inactive passages in the first longitudinal part and in the second longitudinal part.

8. An assembly comprising:

a premix burner having a head;

a lance arranged concentrically in the head and projecting into the premix burner;

a reactor installed in the lance, the reactor comprising a multiplicity of parallel passages which each extend from an inlet side to an outlet side;

all the passages being catalytically active at least in a core region of a cross section though the reactor;

a catalytically active coating on surfaces of the passages which are to be exposed to the gas flow; and the multiplicity of passages comprising catalytically active first and second passages, the catalytically active first passages being in a first longitudinal part of the reactor which includes the inlet side, the first passages having a greater proportion of the surface area provided with catalytically active coating than the catalytically active second passages, the second passages being in a second longitudinal part of the reactor which includes the outlet side and adjoins the first longitudinal part.

9. A burner arrangement, comprising:

a combustion chamber having an exit side;

a main fuel feed connected to the combustion chamber;

a main oxidizing agent feed connected to the combustion chamber;

at least one catalytic reactor connected to the combustion chamber on the exit side;

an additional fuel feed connected to the reactor;

an additional oxidizing agent feed connected to the reactor; and a heating device for preheating the fuel, the oxidizing agent, or both, upstream of the reactor;

wherein the at least one catalytic reactor comprises a multiplicity of parallel passages which each extend from an inlet side to an outlet side;

all the passages being catalytically active at least in a core region of a cross section though the reactor;

a catalytically active coating on surfaces of the passages which are to be exposed to the gas flow; and the multiplicity of passages comprising catalytically active first and second passages, the catalytically active first passages being in a first longitudinal part of the reactor which includes the inlet side, the first passages having a greater proportion of the surface area provided with catalytically active coating than the catalytically active second passages, the second passages being in a second longitudinal part of the reactor which includes the outlet side and adjoins the first longitudinal part.

10. The reactor as claimed in claim 4, wherein the hydraulic diameter of the first passages is double the hydraulic diameter of the second passages.

11. A burner arrangement as claimed in claim 9, configured and arranged for a gas turbine of a power plant.

* * * * *